United States Patent
Dettloff et al.

(10) Patent No.: US 9,462,615 B2
(45) Date of Patent: Oct. 4, 2016

(54) ESTABLISHING A VOICE CONNECTION BETWEEN THE DRIVER OF A SINGLE-TRACK VEHICLE AND AN EMERGENCY CALL CENTER

(71) Applicant: Bayerische Motoren Werke Aktiengesellschaft, Munich (DE)

(72) Inventors: Guenter Dettloff, Eching (DE); Wolfgang Reiml, Freising (DE); Ulrich Marburger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/790,600

(22) Filed: Jul. 2, 2015

(65) Prior Publication Data
US 2016/0007384 A1   Jan. 7, 2016

(30) Foreign Application Priority Data
Jul. 4, 2014 (DE) .......... 10 2014 212 990

(51) Int. Cl.
*H04W 76/00* (2009.01)
*H04W 4/22* (2009.01)

(52) U.S. Cl.
CPC .......... *H04W 76/007* (2013.01); *H04W 4/22* (2013.01)

(58) Field of Classification Search
CPC .......... H04W 76/007; H04W 4/22
See application file for complete search history.

(56) References Cited

U.S. PATENT DOCUMENTS

| 7,200,409 B1 * | 4/2007 | Ichikawa | G08B 25/016 455/426.1 |
| 2006/0229014 A1 | 10/2006 | Harada et al. | |
| 2010/0302029 A1 | 12/2010 | Emmerich et al. | |
| 2013/0130639 A1 * | 5/2013 | Oesterling | H04W 4/027 455/404.1 |

FOREIGN PATENT DOCUMENTS

| DE | 600 18 263 T2 | 8/2005 |
| DE | 10 2008 023 243 A1 | 12/2008 |
| EP | 1 317 888 A1 | 6/2003 |

OTHER PUBLICATIONS

German Search Report dated Mar. 12, 2015 with English-language translation (thirteen (13) pages).

* cited by examiner

*Primary Examiner* — Leon Flores
(74) *Attorney, Agent, or Firm* — Crowell & Moring LLP

(57) ABSTRACT

To establish a voice connection between the driver of a single-track vehicle and an emergency call center, a telematics unit is provided on the vehicle which transmits emergency call signals to the emergency call center. The voice connection is established between the driver and the emergency call center by way of the telematics unit and a mobile radio device carried by the driver of the vehicle.

17 Claims, 2 Drawing Sheets

ESTABLISHING A VOICE CONNECTION BETWEEN THE DRIVER OF A SINGLE-TRACK VEHICLE AND AN EMERGENCY CALL CENTER

CROSS REFERENCE TO RELATED APPLICATIONS

This application claims priority under 35 U.S.C. §119 from German Patent Application No. 10 2014 212 990.7, filed Jul. 4, 2014, the entire disclosure of which is herein expressly incorporated by reference.

BACKGROUND AND SUMMARY OF THE INVENTION

The invention relates to methods and devices for establishing a voice connection between the driver of a single-track vehicle and an emergency call center.

Emergency call systems for motor vehicles, which, in the case of an accident involving the motor vehicle, for example, automatically make an emergency call to an emergency call center, are known. For example, an emergency call device for a motorcycle is known from DE 10 2008 023 243 A1 in which, by means of sensors and a control unit, the sensor data are analyzed and evaluated and a decision is made automatically as to whether an accident involving the motorcycle has occurred. Optionally, an emergency call is sent to a center by means of a communication unit. The emergency call can also contain positional data of the motorcycle which are determined using a navigation device working on the basis of the GPS satellite system provided in the navigation device. To make the decision as to whether an accident involving the motorcycle has occurred, speed sensors, acceleration sensors, tilt sensors, temperature sensors, contact sensors or pressure sensors are provided on the steering wheel and on the seating surface and/or on the footrests of the motorcycle. It is particularly possible to detect if the driver is thrown from the motorcycle during an accident.

DE 10 2008 023 243 A1 also provides the possibility of voice data being transmitted to the emergency call center with the emergency call. Moreover, the possibility is provided for the emergency call center to call the emergency call device back. The emergency call device is designed such that it can be called back and accept this callback.

It is the object of the invention to enable a connection to be established in as reliable a manner as possible between an emergency call center and a driver of a single-track vehicle who has been in an accident if the driver has been thrown from the vehicle as a result of the accident.

This and other objects are achieved according to the invention by a method for establishing a voice connection between the driver of a single-track vehicle and an emergency call center, wherein, on the one hand, a telematics unit provided on the vehicle transmits emergency call signals to the emergency call center and, on the other hand, the voice connection between the driver and the emergency call center is established by way of the telematics unit and a mobile radio device carried by the driver of the vehicle.

The invention is based on the insight that drivers of single-tracked vehicles are generally carrying mobile radio devices with them these days, particularly a cellular phone. With the invention, it is made possible for an emergency call center to establish contact with the driver via this mobile radio device after it has received an emergency call generated automatically by the telematics unit. Through this connection between the emergency call center and the driver—which, incidentally, is independent of the telematics unit and hence independent of the vehicle—it can advantageously be achieved that it is also possible for the emergency call center to speak with the driver even if he were thrown from the vehicle or has left the vehicle for another reason, or if there are loud environmental noises there.

In this context, single-track vehicles are particularly regarded as being motorized vehicles such as motorcycles, motor scooters, mopeds, motor-assisted bicycles and electric bicycles. However, the invention can also be used in conjunction with non-motorized single-track vehicles such as bicycles, for example.

Some examples of mobile radio devices that can be used are cellular phones, which are able to establish communication links on the basis of a mobile radio standard such as, for example, the Global System for Mobile Communications (GSM) standard, particularly including higher versions such as GSM2, GSM3 and/or GSM4 (LTE). In relation to the invention, other radio-based, wireless technologies can also be used as a communication link, such as Wireless Local Area Network technologies (WLAN, Wi-Fi) according to the group of IEEE 802.11x standards, Bluetooth (IEEE 802.15.1) or Near Field Communication (NFC). The invention can particularly also be used when a communication link between a transmitter and a receiver is built over several legs on the basis of several radio technologies, for example for a headset of the driver that can communicate via Wi-Fi with the telematics unit of the vehicle and from the telematics unit to the emergency call center via a GSM mobile radio link.

According to an advantageous exemplary embodiment of the invention, accident-specific data are transmitted from the telematics unit to the emergency call center by way of the emergency call signals if the vehicle is involved in an accident. The transmission can particularly be triggered automatically by the telematics unit. Accident-specific data of the vehicle can be, for example, positional data, speed data, acceleration data, tilt angle data or data from special accident sensors of the vehicle, such as deformation data detected on the vehicle frame, for example.

In a preferred exemplary embodiment of the invention, the emergency call signals are transmitted via a first communication channel and the voice connection is established via a second communication channel that is separate and, in particular, independent from the first communication link.

With the invention, it can particularly and advantageously be achieved that only predetermined data of the telematics unit, particularly data of the vehicle sensors and/or data stored in the vehicle, are transmitted via a first communication channel to the emergency call center and, on a second communication channel, only the voice connection between the driver and the emergency call center occurs. The first communication channel can particularly only exist between the telematics unit and emergency call center and the second communication channel, independently of the first communication channel, between a mobile radio device carried along by the driver, e.g., from a cellular phone of the driver, and the emergency call center. Particularly through the separate transmission of data, particularly of data generated automatically in the vehicle, and of voice signals, particularly of voice signals of the driver, via two separate technical communication channels, it can also be achieved, for example, that reliable sensor signals are transmitted with priority. Moreover, secure and, optionally, redundant data transmission can occur if an at least partially independent infrastructure, for example a distinct mobile radio unit with a distinct SIM card, is used for each of the two channels. In this way, the communication links can optionally also be established reliably and efficiently in the case of country-specific differences or special features, such as when different mobile radio standards are used.

In an especially advantageous exemplary embodiment of the invention, identification data of the mobile radio device are stored in the telematics unit. These identification data can then be forwarded automatically to the emergency call center by the telematics unit and particularly by way of the emergency call signals. Particularly if the identification data are transmitted with the first emergency call signals to the emergency call center, the emergency call center can be enabled very quickly upon receipt of the automatic emergency call to establish a direct connection to the mobile radio device of the driver via the corresponding identification data. The identification data particularly constitute link data for a radio network such as, for example, the mobile phone number of a cellular phone, an IP address for a mobile radio device registered on a wireless computer network such as Wi-Fi, a corresponding Bluetooth address, or the like.

With the invention a provision can particularly advantageously be made that a cellular phone being carried by the driver is, on the one hand, used in a manner that is technically independent of a telematics unit or emergency call system integrated firmly in the vehicle and, on the other hand, functionally integrated into the further processing of an emergency call made by the telematics unit, for example through a callback to the mobile telephone made from the emergency call center. For this purpose, all that is required of the telematics unit is that the corresponding identification or mobile phone number be stored therein and that this number be transmitted with the emergency call to the emergency call center.

In another advantageous exemplary embodiment of the invention, several identification numbers for a mobile radio device or several identification numbers for different respective mobile radio devices are stored in the vehicle, particularly in the telematics unit. For a dual SIM cellular phone, for example, the two numbers of the two SIM cards can be stored. It is also possible for the identification data for different mobile radio devices of different drivers to be stored, respectively. During the transmission of the identification data to the emergency call center, it is then possible for all or selected identification data to be transmitted as appropriate in order to enable reliable establishment of a connection to the driver.

To enable appropriate selection from a plurality of identification data stored in or in association with the vehicle, a provision can advantageously be made that time data be allocated and stored for the multiple sets of identification data which are representative of when the mobile radio devices associated with the respective identification data were used in conjunction with the vehicle and/or were stored in the memory. This makes it possible to evaluate the respective currentness of the identification data and/or the frequency of use of the respective mobile radio device in conjunction with the vehicle. In this way, it can particularly be decided with respect to the transmission of the emergency call signals which of the identification data are to be transmitted to the emergency call center. Moreover, on the basis of the number allocations, an appropriate sequence can be established in the attempts at establishing a connection between emergency call centers in order to actually reach the driver currently involved in an accident as quickly as possible.

In another advantageous exemplary embodiment of the invention, the mobile radio device is provided in a piece of protective equipment of the driver. It can particularly be integrated therein, for example in a helmet or a combination protective suit.

To establish the voice connection, the telematics unit can also be used as a switching center between a mobile speech device of the driver and emergency call centers. The speech device can, for example, be a cellular phone, a radio device or a completely or partially wired voice system between driver, co-driver and/or a control device of the vehicle.

The establishment of the voice connection can particularly be initiated by the telematics unit, by the emergency call center, by the mobile radio device and/or by the driver.

With the invention, an emergency call system for a single-track vehicle can also be specified in order to establish a voice connection between the driver of the single-track vehicle and an emergency call center. It comprises a telematics unit and a mobile radio device carried by the driver. The emergency call system is set up such that it can transmit emergency call signals to the emergency call center by way of the telematics unit and that the voice connection between the driver and the emergency call center can be established by way of the telematics unit and the mobile radio device.

A commensurate telematics unit for establishing a voice connection between a driver and an emergency call center is set up such that the telematics unit can transmit emergency call signals to the emergency call center and that the voice connection between the driver and the emergency call center can be established by way of the telematics unit and the mobile radio device. With the invention, a single-track vehicle can also be specified which comprises such a telematics unit.

In the framework of the invention, features from the publication DE 10 2008 023 243 A1 cited herein can also be provided for the emergency call system and operation thereof. This publication is hereby incorporated into the present description by reference for this purpose.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, the same or similar parts or functions are designated by the same reference symbols across the figures. As will also readily be understood, parts and functions shown in one figure can also be used in exemplary embodiments in other figures even if they are not depicted therein.

Figure 1:
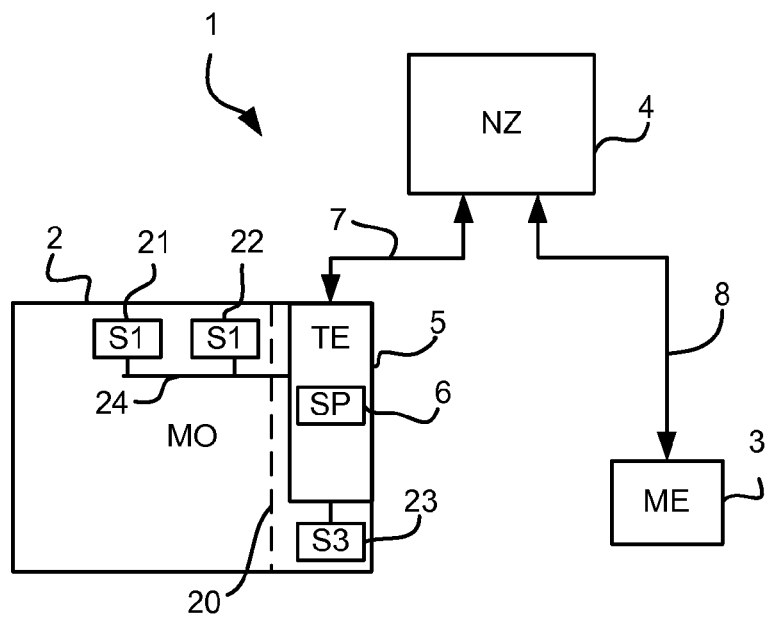
FIG. 1 is a schematic block diagram of a first emergency call system.

In the emergency call system 1 shown in FIG. 1 for a motorcycle 2, a telematics unit 5 is provided in an intrusion-protected area 20 of the motorcycle 2 with which mobile radio communication with an emergency call center 4 can occur via a communication channel 7. For this purpose, the telematics unit 5 has inherently known mobile radio components such as, for example, a SIM card, an antenna, etc.

The connection to the emergency call center 4 is established via a mobile radio network infrastructure having appropriate interfaces. The communication channel 7 can have at least partially wired connection parts, computer network-bound and, particularly, internet-based connection parts. The emergency call center 4 particularly includes a computer and a voice interface such as a telephone or a headset, for example. The emergency call center 4 can also include a distributed computer network. It can be operated by a company, for example the manufacturer of the telematics unit and/or the manufacturer of the motorcycle. The emergency call center can also be part of a public institution, for example a rescue control center of a fire department or of other emergency rescue services.

Various sensors are provided on the motorcycle 2 which detect, for example, driving dynamic variables and/or accident-specific variables, for example a speed sensor 21 and an acceleration sensor 22. Their sensor values can be transmitted via a data bus 24 to the telematics unit 5. A GPS positional sensor 23 is provided in the intrusion-protected area 20 of the motorcycle 2 to whose geographic positional data the telematics unit 5 has access. Additional sensors, such as a tilt sensor, for example, can be provided in the intrusion-protected area 20.

FIG. 1 also shows a cellular phone 3 that the driver of the motorcycle 2 carries with him, for example in the pocket of his protective suit. The mobile phone number associated with this mobile telephone 3 is stored in the electronic data storage 6 of the telematics unit 5. The cellular phone 3 has appropriate components for a mobile radio link, for example based on the standards GSM, GSM2, GSM3 and/or GSM4 (LTE). It can also have other radio interfaces, such as a Wi-Fi interface, a Bluetooth interface or an NFC interface. A wired interface, such as a USB interface, for example, can also be provided. The cellular phone 3 can have a plurality of other functions, particularly functions controlled by use of computer programs (including apps), and particularly be a so-called smart phone. The inputting and saving of the mobile phone number in the data storage 6 of the telematics unit 5 can be done manually by the driver, or these processes can be performed automatically in whole or in part, particularly under the control of the telematics unit 5 and, for example, by way of a suitable application (so-called "app") stored on the cellular phone 3 and using one of the respective existing wireless or wired interfaces such as Bluetooth, Wi-Fi, USB, etc.

If it is detected on the basis of registered sensor data of the motorcycle 2, for example by an evaluation and control unit (not shown here) of the motorcycle 2, that the motorcycle 2 has been involved in an accident, then the telematics unit 5 builds the communication link 7 to the emergency call center 4 and transmits to it by way of corresponding emergency call signals an accident report and, optionally, data registered by the sensors 21, 22, etc., of the motorcycle 2. The current positional data of the motorcycle 2 detected by the sensor 23 are also transmitted to the emergency call center 4 on the basis of which the emergency call center 4 can have rescue workers directed to the scene of the accident. The telematics unit 5 also transmits the mobile phone number of the cellular phone 3 stored in the data storage 6 via the communication link 7 to the emergency call center 4. Using this mobile phone number, the emergency call center 4 can establish a communication link 8 to the cellular phone 3, i.e., directly to the driver involved in an accident, that is independent from the communication link 7. As a result, a voice and/or data connection can be established between the cellular phone 3 and the emergency call center 4 independently of whether the driver involved in an accident is located at the motorcycle 2 or at a distance therefrom. A person at the emergency call center 4 can make inquiries telephonically, for example, via the communication link 8. In addition, it is also possible to transmit data, for example text messages, images and/or video sequences produced with the cellular phone 3, via this communication link 8 to the emergency call center 4. The communication link 8 can particularly be established by the cellular phone 3 via one of the GSM mobile radio standards.

Figure 2:
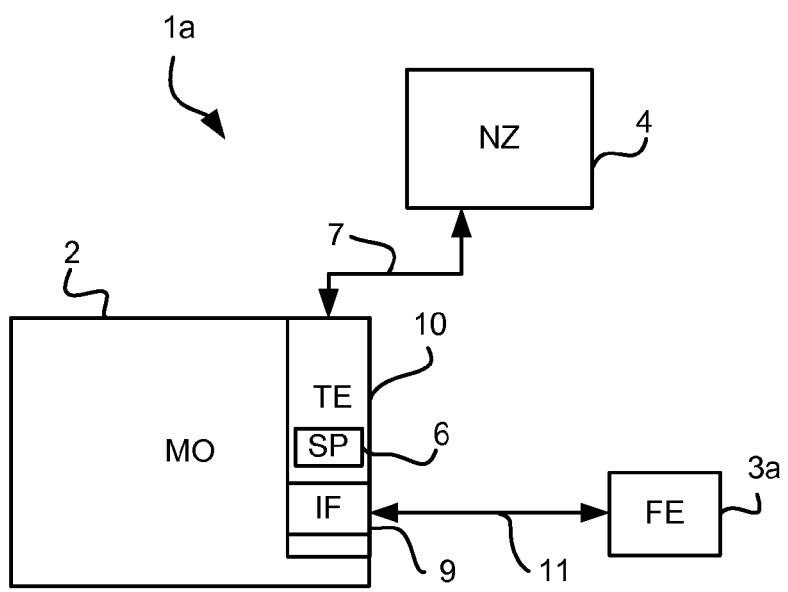
FIG. 2 is a schematic block diagram of a second emergency call system.

FIG. 2 shows an emergency call system 1a in which the telematics unit 10 also has an interface 9 with which a data connection and/or voice connection can be established via a communication path 11 to a mobile hands-free speech device 3a carried along by the driver in his helmet. The hands-free speech device 3a has an appropriate interface (not shown in the figure) for this purpose. The interface 9 enables at least partially wireless data transfer and can be embodied, for example, as a Wi-Fi or Bluetooth interface. Via the interface 9, an identification number such as, for example, an IP address of the hands-free speech device 3a can be read into or assigned automatically in whole or in part to the telematics unit 10 and stored in the data storage 6. If an emergency call is made in the motorcycle 2 by the telematics unit 10, appropriate accident-related sensor data, positional data, etc., are transmitted to the emergency call center 4 via the communication channel 7. Furthermore, the telematics unit 10 creates a data- and/or voice connection to the hands-free speech device 3a of the driver via the interface 9 and the communication path 11 and automatically establishes a commensurate connection between the hands-free speech device 3a and the emergency call center 4. As a result, the emergency call center can contact the driver directly telephonically and/or by data transfer. Particularly if the communication path is wireless, such contact can be ensured even if the driver is not on or at the motorcycle, for example because he was thrown from the motorcycle during the accident.

Figure 3:
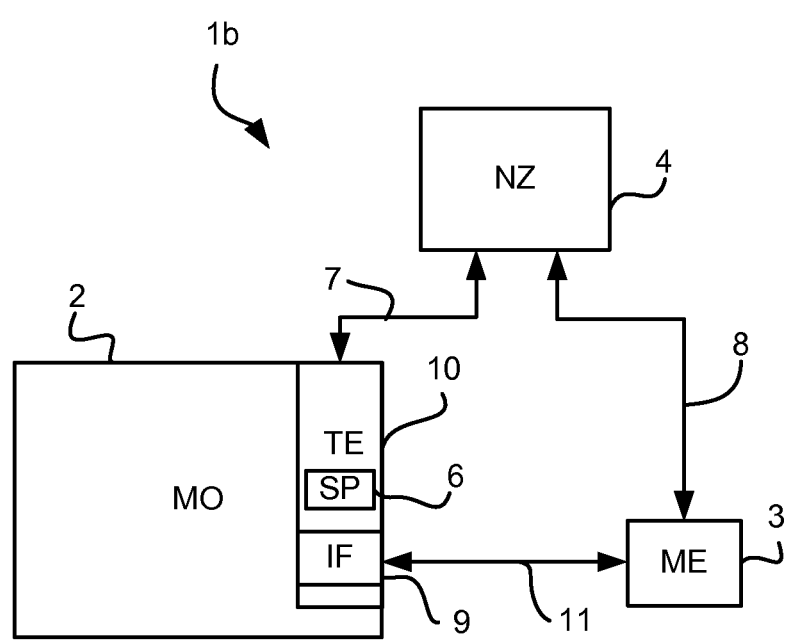
FIG. 3 is a schematic block diagram of a third emergency call system.

In the emergency call system 1b shown in FIG. 3, the telematics unit 10 of the motorcycle 2 transmits emergency call signals to the emergency call center 4 via the communication channel 7 after the accident. In addition, a telephone number of the emergency call center 4 is stored in its data storage 6 and a mobile telephone number of the mobile telephone 3. In a first exemplary embodiment, the mobile telephone number of the mobile telephone 3 is transmitted with the emergency call to the emergency call center 4, which then calls the mobile telephone 3 via the communication channel 8 in order to speak with the driver at the scene of the accident. In a second exemplary embodiment, the telematics unit 10 transmits the emergency call number of the emergency call center 4 from the data storage 6 via the interface 9 (e.g., Wi-Fi) and communication path 11 to the cellular phone 3. The emergency call center 4 can then be called at this number via the communication channel 8 using the mobile telephone 3 by the driver himself or automatically by a program (app) stored in the cellular phone 3 and/or in a manner mediated by the telematics unit 10. In a third exemplary embodiment, the telematics unit 10 transmits the mobile phone number of the cellular phone 3 to the emergency call center 4 via the communication channel 7 and the emergency call number of the emergency call center to the mobile telephone 3 via the communication channel 8. Both the emergency call center 4 and the mobile telephone 3 thus have the contact data of the other, thus redundantly ensuring that a connection can be established between the emergency call center 4 and the driver via the communication channel 8. The transmission of the identification number of the cellular phone 3 and/or of the emergency call number between the mobile telephone 3 and the memory 6 can occur via the interface 9, which can be wired, e.g., as a USB interface, or wireless, e.g., as a Wi-Fi or Bluetooth interface, for this purpose.

The device and system components described are particularly controlled using computer programs and can also have inherently known elements of computers and digital control devices such as a microprocessor, volatile and non-volatile memory, interfaces, etc. The invention can therefore also be implemented in whole or in part in the form of a computer program product which brings about the inventive process in whole or in part upon being loaded and executed on a computer. For example, it can be made available in the form of a data carrier such as a CD/DVD or a USB stick or even in the form of one or more files on a server from which the computer program can be downloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of establishing a voice connection between a mobile radio device carried by a driver of a single-track vehicle and an emergency call center, the method comprising the acts of:
    transmitting emergency call signals, by a telematics unit provided on the single-track vehicle, to the emergency call center;
    transmitting, by the telematics unit to the emergency call center in connection with said transmitting of the emergency call signals, a mobile phone number of the mobile radio device carried by the driver of the single-track vehicle; and
    establishing, via the mobile radio device, the voice connection to the driver, wherein the voice connection is initiated by the emergency call center using the transmitted mobile phone number.

2. The method according to claim 1, wherein the transmitting acts for both the emergency call signals and the mobile phone number are carried out by transmitting accident-specific data of the emergency call signals if the single-track vehicle is involved in an accident.

3. The method according to claim 1, wherein the mobile radio device is a cellular phone carried by the driver.

4. The method according to claim 1, wherein
    the emergency call signals are transmitted via a first communication channel, and
    the voice connection is established via a second communication channel, the second communication channel being separate from the first communication channel.

5. The method according to claim 1, further comprising the act of:
    storing, in the telematics unit provided on the single-track vehicle, identification data of the mobile radio device.

6. The method according to claim 5, wherein the identification data is the mobile phone number of the mobile radio device.

7. The method according to claim 5, wherein several identification numbers for the mobile radio device or one each for respective mobile radio devices are stored in a data storage of the telematics unit.

8. The method according to claim 7, wherein time data are allocated and stored for multiple sets of identification data, the time data being representative of when a respective mobile radio device associated with the respective identification data was used in conjunction with the signal-track vehicle and/or was input into the data storage of the telematics unit.

9. The method according to claim 8, further comprising the act of:
    deciding, based on the time data, which of the identification data are transmitted to the emergency call center in the emergency call signals.

10. The method according to claim 1, wherein the mobile radio device is integrated into a piece of protective equipment for the driver.

11. The method according to claim 1, wherein the act of establishing the voice connection uses the telematics unit as a switching center between the mobile radio device of the driver and the emergency call center.

12. An emergency call system for a single-track vehicle for establishing a voice connection between a driver of the single-track vehicle and an emergency call center, the system comprising:
    a telematics unit;
    a mobile radio device carried by the driver;
    wherein the emergency call system is configured to:
        transmit emergency call signals to the emergency call center by the telematics unit,
        transmit to the emergency call center by the telematics unit and in connection with transmitting the emergency call signals, a mobile phone number of the mobile radio device carried by the driver, and
        establish, via the mobile radio device, the voice connection to the driver, wherein the voice connection is initiated by the emergency call center using the transmitted mobile phone number.

13. The emergency call system according to claim 12, wherein
    the telematics unit comprises a data storage in which identification data of the mobile radio device, including the mobile phone number, are stored for a communication, and
    the emergency call system is configured such that the stored identification data, including the mobile phone number, is transmitted to the emergency call center via the telematics unit.

14. A telematics unit for establishing a voice connection between a mobile radio device carried by a driver and an emergency call center, the telematics unit comprising:
    a processor configured to execute program code to:
        transmit emergency call signals, via by a telematics unit provided on the single-track vehicle, to the emergency call center;
        transmit to the emergency call center by the telematics unit and in connection with transmitting the emergency call signals, a mobile phone number of the mobile radio device carried by the driver; and
        establish, via the mobile radio device, the voice connection to the driver, wherein the voice connection is initiated by the emergency call center using the transmitted mobile phone number.

15. The telematics unit according to claim 14, further comprising:
    a data storage of the telematics unit, identification data of the mobile radio device, including the mobile phone number, being stored for a communication in the data storage, wherein the stored identification data, including the mobile phone number, are transmittable to the emergency call center via the telematics unit.

16. The telematics unit according to claim 14, wherein the telematics unit is a part of a single-track vehicle.

17. The telematics unit according to claim 16, wherein the single-track vehicle is a motorcycle.

\* \* \* \* \*